D. CLYNEKE.
GRAIN DRILL.
APPLICATION FILED AUG. 21, 1916.

1,298,009.

Patented Mar. 25, 1919.

Witness
W. C. Fielding
Wade Koontz

Inventor
Dezere Clyneke

By Richard Oliver
Attorney

UNITED STATES PATENT OFFICE.

DEZERE CLYNEKE, OF BOULDER, COLORADO.

GRAIN-DRILL.

1,298,009.  Specification of Letters Patent.  Patented Mar. 25, 1919.

Application filed August 21, 1916. Serial No. 116,182.

*To all whom it may concern:*

Be it known that I, DEZERE CLYNEKE, a citizen of Belgium, residing at Boulder, in the county of Boulder and State of Colorado, have invented certain new and useful Improvements in Grain-Drills, of which the following is a specification.

This invention relates to grain drills and has for its object the production of a device that will add weight to the ordinary form of seed drilling mechanism whereby the seed will be deposited at such a depth as to keep the same from being blown out by the wind and also to get the desired moisture.

Another object of this invention is to provide a device of the kind above described that is simple in construction, efficient in operation and consists of the minimum number of parts.

With these and other objects in view, this invention consists of certain novel constructions, combinations and arrangement of parts, as will be hereinafter fully described and claimed.

10 designates the frame of an ordinary seed drill, 11 the seed box thereof having the tube 12 extending therefrom into the droppers 13 each of which has carried thereby the disks 14.

Figure 1:
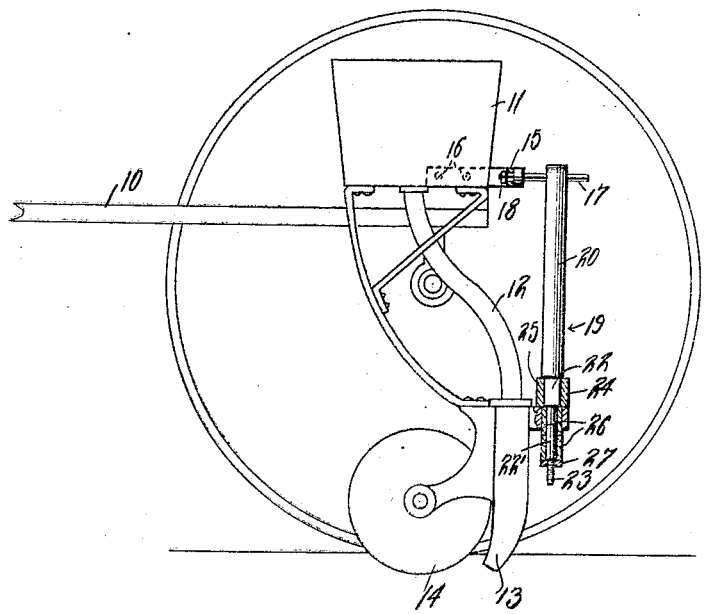
Figure 1 is a view in side elevation of a grain drill with my improved device mounted thereon, the same being partly shown in section.
Figure 2:
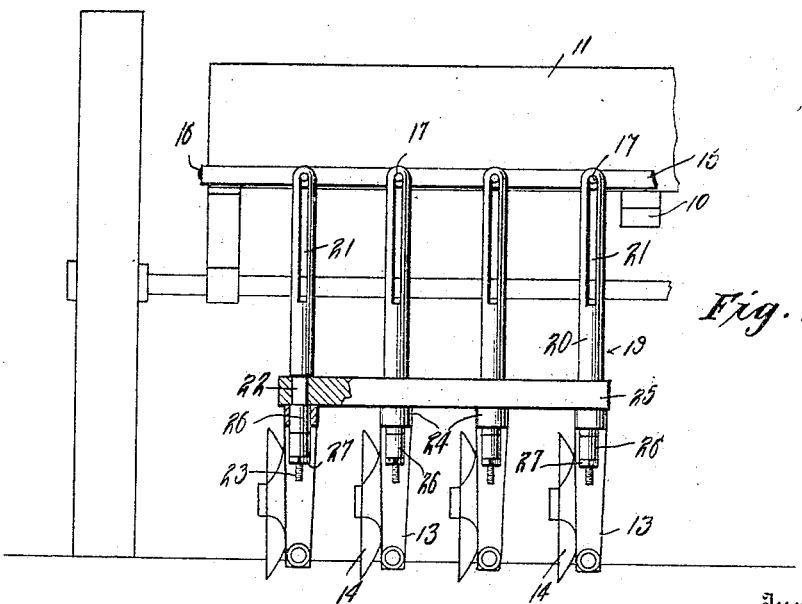
Fig. 2 is a fragmentary view in rear elevation of the device as shown in Fig. 1.

My invention consists in the attachment for the drill above mentioned and comprises a strip 15 having ends thereof bent as at 16 to engage the ends of the seed box 11 and thus space the major portion of the strip 15 from the said box. The strip 15 or more specifically, the major portion thereof, has a plurality of uniformly spaced apertures into which the supporting bolts 17 are positioned the same being secured therein by the nuts 18. A plurality of standards designated in their entirety by the numeral 19 are provided for this device, the same comprising a body portion 20 having elongated slots 21 formed therein, and a reduced portion 22 at the opposite ends thereof from that of the formation of the slot 21. The standards are further reduced as at 22′ and terminate in the threaded extremities 23. Each of these standards is supported by one of the bolts 17 the same being in engagement with the standards by having a portion thereof projected through the slot 21 formed therein and the reduced portion of each of said standards 19 is to be positioned through the openings formed in the enlargement 24 carried by each of the seed droppers 13. However positioned on the enlargement 24 of the seed droppers 13 and against the shoulder on each of the standards 19 caused by the reduced portion 22 thereof is a weight 25 that of course is provided with the suitable uniformly spaced apertures for the reception of the reduced portion 22 of the members 19. Suitable collars 26 are positioned on the reduced portion 22′ of the standards 19 the said collars, as shown in Figs. 1 and 2 extending through the enlargement 24 and into engagement with the weight 25. These collars are held in place by means of the nuts 27 on the threaded extremities 23 of the standards.

By constructing a device as has been previously described connected to a seed drill in the manner heretofore set forth the seed dropping mechanism is weighted and therefore the seeds planted are positioned at the desired depth to prevent the same from being blown away. Furthermore it is to be understood that this device can be used with any type of seed planting machine all that is necessary is that the supporting strip 15 be in such a position as to support the standards 19 so as to allow the same to engage the seed dropping mechanism so that the weight may be applied for the desired purpose.

It is obvious that minor changes may be made in the form and construction of this invention without departing from the material parts thereof. It is therefore not wished to confine the invention to the exact form herein shown and described, but it is wished to include all such as properly come within the scope claimed.

I claim:

1. In combination with a seed drill having a plurality of drill teeth, of a means for weighting said drill teeth, a support having a plurality of openings therein, bolts carried by said support and passing through each of said openings, a standard carried by each of said bolts, a weight carried by said standards and means for permitting independent vertical movement of the drill teeth.

2. In combination with a seed drill having a plurality of drill teeth, of a means for weighting said drill teeth comprising a support carried by said seed drill including a plurality of bolts, a plurality of standards each having an elongated slot formed therein for the reception of one of said bolts of said support, each of said standards in engagement with one of said drill teeth of said seed drill, a weight carried by said standards and in engagement with said drill teeth and means on said standards for permitting independent vertical movement of the drill teeth.

3. In combination with a seed drill having a plurality of drill teeth each having an enlargement formed thereon provided with an opening therethrough, of a means for weighting said drill teeth comprising a support carried by said seed drill, a plurality of standards carried by said support having the lower ends thereof projected through said openings in said enlargements on said drill teeth, a weight having a plurality of openings formed therein one of said standards passing through each of said openings in said weight and means on said standards below said weights for permitting independent vertical movement of the drill teeth.

In testimony whereof I affix my signature in presence of two witnesses.

DEZERE CLYNEKE.

Witnesses:
LYMAN T. ELWELL,
JOHN STORBER, Jr.

Copies of this patent may be obtained for five cents each, by addressing the "Commissioner of Patents, Washington, D. C."